July 31, 1951 S. J. STEVENSON ET AL 2,562,586
LOAD ANTICIPATOR FOR ENGINES
Filed Oct. 1, 1949 5 Sheets-Sheet 1

Inventors:
Samuel J. Stevenson
Theodore H. Klusman
Herman S. Fisher
By Paul O. Pippel
Atty.

July 31, 1951

S. J. STEVENSON ET AL 2,562,586

LOAD ANTICIPATOR FOR ENGINES

Filed Oct. 1, 1949

July 31, 1951 S. J. STEVENSON ET AL 2,562,586
LOAD ANTICIPATOR FOR ENGINES
Filed Oct. 1, 1949 5 Sheets-Sheet 4
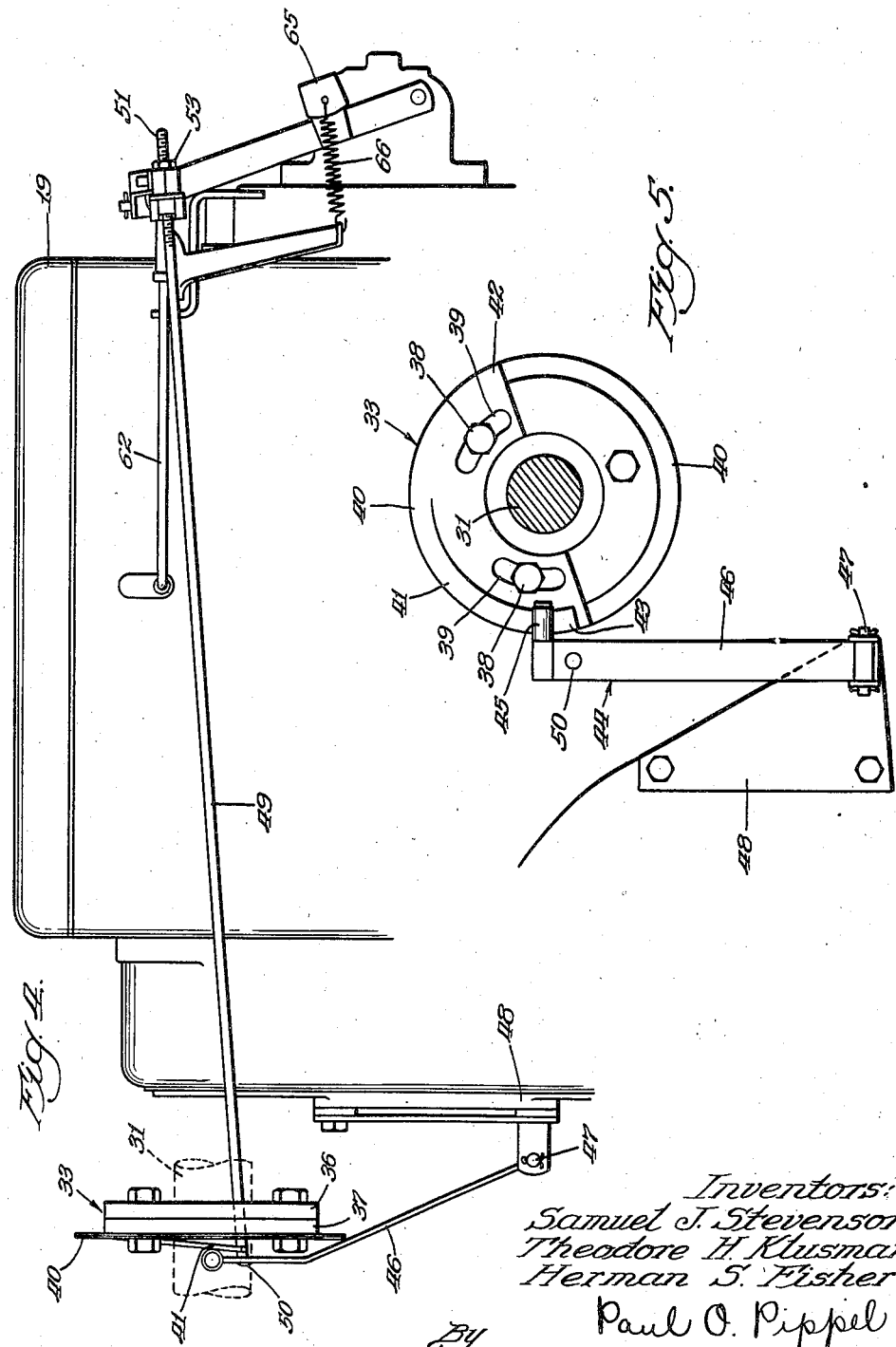
Inventors:
Samuel J. Stevenson
Theodore H. Klusman
Herman S. Fisher
By Paul O. Pippel
Atty.

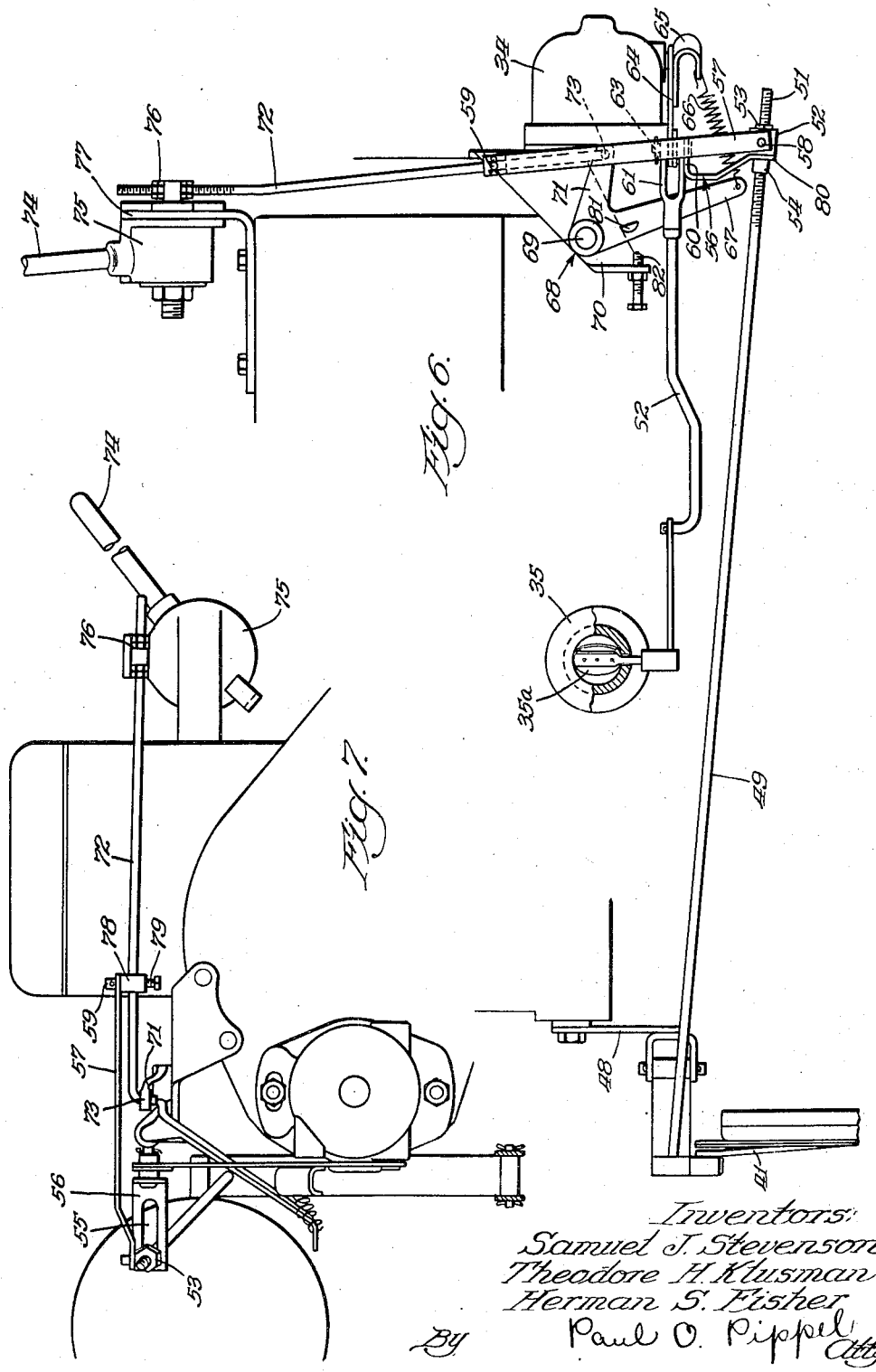

Patented July 31, 1951

2,562,586

UNITED STATES PATENT OFFICE 2,562,586

LOAD ANTICIPATOR FOR ENGINES

Samuel J. Stevenson and Theodore H. Klusman, Rio Vista, and Herman S. Fisher, Walnut Grove, Calif., assignors to International Harvester Company, a corporation of New Jersey Original application July 12, 1947, Serial No. 760,556. Divided and this application October 1, 1949, Serial No. 119,148

11 Claims. (Cl. 123—99)

This invention relates to a load anticipator for engines and is a division of our copending application for "Load Anticipator for Balers," filed July 12, 1947, and having Serial No. 760,556.

An important object of this invention is the provision of means for automatically providing auxiliary engine acceleration at certain periods of operation when the engine is under load, but to eliminate the function of this automatic operating means when the engine is merely idling.

Another important object of this invention is the provision of means for automatically actuating the throttle in the carburetor of an engine associated with an implement of varying power requirements such as a hay baler and effecting a boost in engine power when needed or when used with a baler upon the compression or working stroke of a bale forming plunger.

Other and further important objects will become apparent from the disclosures in the following specification and accompanying drawings in which:

Figure 4 is an enlarged view of portions of the device as shown in Figure 2.

Figure 5 is an elevational diagram of the cam operator employed in this invention.

Figure 6 is a plan view of the operating mechanisms of this device.

Figure 7 is a front elevational view of the device as shown in Figure 6.

Figure 2:
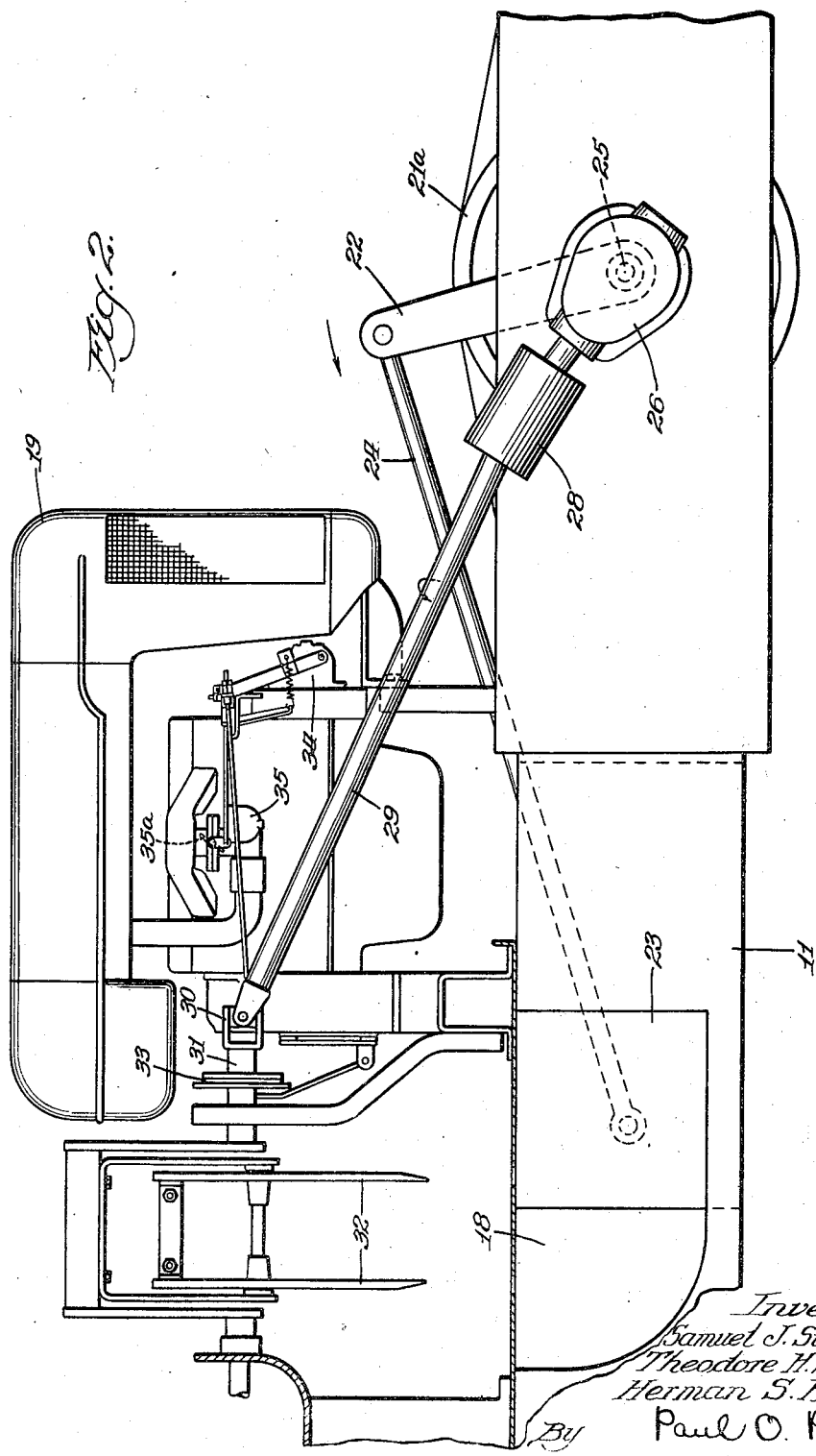
Figure 2 is a side elevational view of the engine and portions of the baler as shown in Figure 1.
Figure 3:
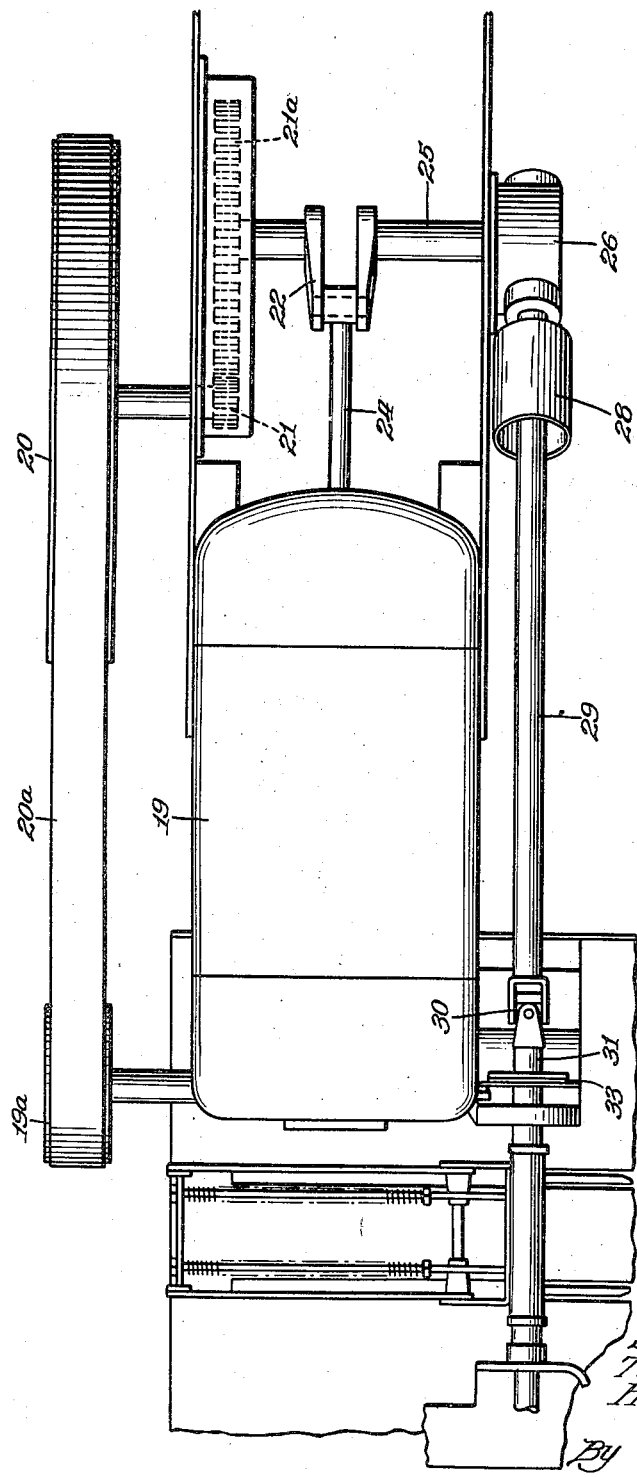
Figure 3 is a top plan view of the device as shown in Figure 2.

As shown in the drawings, the reference numeral 10 indicates generally a pick-up baler having a longitudinally extending bale forming chamber 11, a tractor hitch 12, a supporting wheel 13, and a pick-up structure 14 having a rotating tined cylinder 15 adapted to pick hay or straw from a windrow and throw it upwardly and rearwardly onto a transversely extending platform 16. An auger conveyor 17 carries the hay or straw deposited on the platform to a side opening 18 in the bale forming chamber 11 as best shown in Figure 2. An engine 19 is mounted and carried above the bale forming chamber 11 and is adapted to drive the numerous baling mechanisms.

Drive from the engine is carried from pulley 19a to a large belt fly wheel 20 by means of a belt 20a and thereupon to a small spur gear 21 to a large gear 21a having a crank arm 22 driven thereby. As shown in Figure 2 a plunger 23 is slidably mounted in the bale forming chamber 11 and has a connecting rod 24 joining it to the crank arm 22. Upon rotation of the large gear 21 the bale compressing plunger 23 is reciprocated in the longitudinally extending bale chamber 11.

Figure 1:
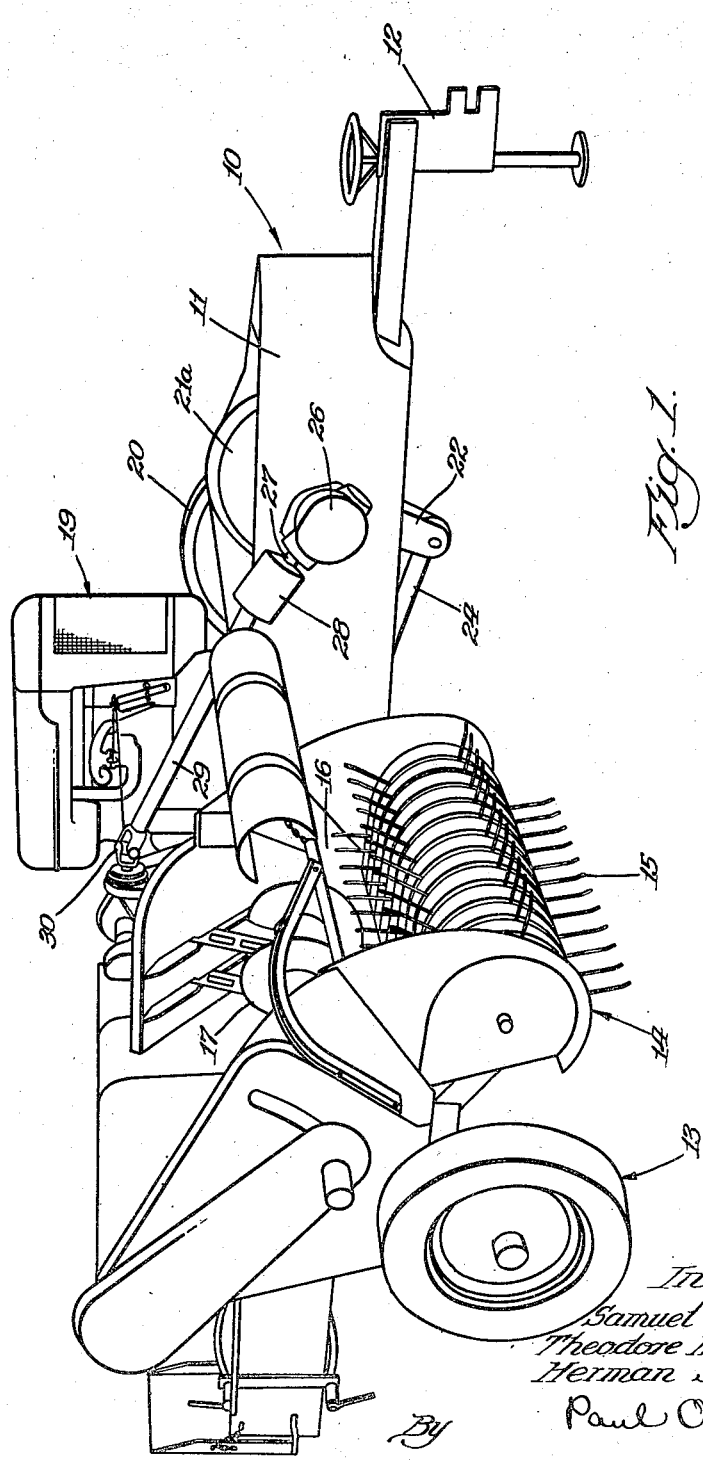
Figure 1 is a perspective view of a pick-up hay baler incorporating the principles of this invention.

The large gear 21 is mounted on a shaft 25 which enters a gear housing 26 on the inner side wall of the longitudinally extending bale chamber 11. Rotational drive from the shaft 25 is transmitted to a drive shaft 27 to a universal joint (not shown) having a shield 28. A shaft 29 is driven through the universal joint and extends upwardly and rearwardly as shown in Figures 1 and 2 terminating in a universal joint 30. A shaft 31 extends rearwardly from this joint 30 and imparts drive to a pair of packing fingers 32 in a gyratory movement. A disc 33 is mounted on and driven with the shaft 31. Rotation of the disc 33 causes operation of the engine surge provided for by the device of this invention. The engine 19 employs all of the regular essentials such as a speed governor 34 and a carburetor 35, having a throttle 35a.

The disc 33 as shown in Figures 4 and 5 comprises adjacent plates 36 and 37. Bolts 38 are employed to hold the plates together. As shown in Figure 5 the plates 36 and 37 are movable rotatably with respect to each other by reason of the slots 39. The plate 37 carries a large disc 40 which has an outwardly extending spring cammed surface as shown at 41. The cam is slightly circular in shape and covers substantially half the disc 40. The cam extends from a low point at 42 to a high point at 43. Upon rotation of the shaft 31 the disc 33 rotates and by means of a cam follower 44 a roller 45 riding on the cam surface 41 causes the follower to move longitudinally with respect to the shaft 31. As best shown in Figures 4 and 5 the cam follower roller 45 is journalled on arm 46 which is hinged at 47 to a further part of the engine 19 at 48. Rotation of the disc 33 therefore causes the follower 44 to swing outwardly about its hinge 47.

A link rod 49 is carried and held loosely in the arm 46 at 50. The cam 41 imparts longitudinal movement of the link rod 49. As best shown in Figure 6 the rod 49 is threaded at its other end as shown at 51 and has a sleeve stop 52 held thereon by means of a nut 53. The stop 52 has a reduced diameter extension 54 adapted to slide within a slot 55 in the bracket member 56 as shown in Figure 7. An arm 57 is pivotally attached at 58 to the sleeve 52 and thus axial movement of the link 49 causes swinging movement of the arm 57 about a pivot 59. Movement of the link 49 by means of the cam 41 will cause the bracket 56 to be moved with the link 49 by reason of the stop 52 abutting the bracket 56. The upper end of the bracket 56 as viewed in Figure 6 includes a flange 60 which lies parallel with a closely adjacent clevis or yoke 61 at the end of the throttle operating arm 62 of the carburetor 35 on the engine. A pin 63 passes through the clevis and the flange 60 so that movement of the bracket 56 causes a corresponding movement of the throttle operating link 62. Movement of the link 49 by reason of the cam 41 causes the throttle 35a in the carburetor to be opened, thus admitting more fuel and increasing the speed of the engine 19.

The purpose of the slots 39 in the disc 37 is to place the cam 41 on that portion of the periphery of the disc 33 which will effect engine surging or acceleration at a time just prior to the end of the compression stroke of the plunger 23. As stated in the objects above, the greatest load on the engine occurs at that time when the plunger is performing its greatest work on the compressing of the hay or straw into a bale. Each revolution of the driven shaft 31 coincides with one complete revolution of the gear 21a and thus also one complete revolution of the bale compressing plunger 23. It is obvious then that there is a definite timed relationship between the disc 33 and the reciprocation of the plunger 23. Engine surging need not continue to the full end of the compression stroke as inertia of the massive plunger assists in maintaining regular plunger operation after it has received a little boost. In view of this the cam is timed to speed up the engine for just a portion of the compression stroke whereupon inertia of the moving parts carries operation to completion.

Engines employed on farm implements such as balers are equipped with governors which act to control the throttle opening of the engine carburetors. Control of engine operation is therefore made through changes in the governor rather than through changes to the throttle. As described above, the cam acceleration of the engine is caused by by-passing the governor 34 and acting to directly change the throttle opening. Governors as a rule operate on the principle of the throwing of weights centrifugally outwardly upon the attainment of some predetermined speed. The weights in the governor are counterbalanced by a spring which tends to hold the weights against the centrifugal action caused by rotation. However, the spring is set to yield upon the attainment of this predetermined rate of speed. Change in governor operation can be effected only by changing the weights or the counterbalancing spring. In the present case the governor operating arm 64, the position of which is controlled directly by the position of the weights internally of the governor, is attached to the clevis 61 of the throttle operating link by means of the pin 63 and at the same point of attachment of the arm 60 of the bracket 56. When the governor arm 64 moves it acts to directly open or close the throttle.

A U-shaped bracket 65 is welded or otherwise attached to the governor operating arm 64 and is joined by a spring 66 to the one end 67 of a bell-crank lever 68 which is pivoted for rotational movement at 69 on a fixed bracket 70. The bell-crank lever 68 has a second arm 71 extending at substantially right angles to the arm 67. The arm 71 joins an operating link 72 at 73. A speed regulating hand lever 74 is adapted to rotate a frictional operating drum 75 to cause shifting of the link 72 through an adjustable attachment shown at 76. There is sufficient frictional resistance within the drum 75 to cause the drum to remain in any adjusted position with respect to its fixed bracket support 77 upon movement of the control arm 74. Hence the link 72 may be placed in any position and held there without the operator constantly holding the hand lever 74. It is apparent that movement of the hand control lever 74 will effect a direct change in the extension or contraction of the spring 66. If the spring is extended, it adds to the adjustability of the governor's weights and similarly, if the spring 66 is contracted the governor weights are relatively unaffected by the action of the spring 66. Therefore, when the spring 66 is extended the governor permits the engine to attain higher speeds and contrarily, when the spring 66 is contracted the speed of the engine is held down. Manual control of governor operation and thus engine speed is not affected by the automatic engine surger of this invention.

As best shown in Figure 7, the pivot 59 is part of a trunnion 78 and forms an attachment between the arm 57 and the link 72. This trunnion is adjustable by means of a set screw 79 along the length of the connecting rod 72. Upon movement of the hand control lever 74 movement is imparted to the arm 57 as well as the link 72 and thus the entire cam operated link 49 swings about its loose connection with the hinged cam follower, and with the cylindrical portion 54 of the sleeve 52 riding upwardly in the slot 55 of the bracket 56.

In the position as shown in Figures 6 and 7 the speed of the engine is shown as being sufficient to carry on normal bale operation. Engine idling is accomplished by moving the hand lever 74 forwardly causing link 72 and arm 57 to move the connecting link 49 to the inner end of the slot 55 in the bracket 56. The apparatus is arranged and constructed so that the engine does not surge while idling. This is accomplished by the peculiar shape of the bracket 56. For convenience, the bracket 56 will be designated as possessing a C-shape. When the cam effects longitudinal axial movement of the rod 49, the stop 52 shifts, but because of the C-shape of the bracket 56 the stop does not engage the bracket and thus has no effect whatever on the positioning of the engine throttle. When the engine is speeded up by movement of the hand control lever 74, the stop 52 moves downwardly and is closely adjacent the lower extension 80 of the bracket 56 so that shifting of the rod 49 by the cam 41 will cause immediate shifting of the bracket 56 and thus a resetting of the throttle of the engine.

Movement of the bell-crank lever 68 is limited by means of a stop member 81 contacting an adjustable abutment 82. As previously stated, the hand control lever may be operated through its full range of movement without being effected by the engine load anticipator, which has been superimposed on the controls of the carburetor throttle. Further, this mechanism is superposed onto the regular engine operating means in a manner to avoid engine acceleration during that time when the engine is idling.

Various details of construction may be varied throughout a wide range without departing from the principles disclosed herein and we therefore

What is claimed is:

1. In an engine and a speed control for the operation therefor comprising means responsive to said engine operation to automatically shift the speed control in a manner to cause surging of the engine at intervals in the operation thereof.

2. In an engine delivering rotational output and controls therefor comprising means responsive to said rotational output to automatically shift the engine controls in a manner to cause surging of the engine at intervals in the operation thereof.

3. In an engine having shaft means rotatably driven thereby and control means therefor, including a cam mounted on said rotatably driven shaft means, means operable by said cam to shift said engine control means whereby engine operation is changed on each revolution of the driven shaft and cam.

4. In an engine having shaft means rotatably driven thereby and control means therefor operable throughout a range of engine speeds, including a cam mounted on said rotatably driven shaft, means operable by said cam in predetermined position of the engine control means to momentarily change engine speed, and said means operable by said cam being ineffective to change engine speed from another initial predetermined position of the engine control means.

5. In an engine having shaft means rotatably driven thereby and control means operable between advance and retarded positions therefor, including a cam mounted on said rotatably driven shaft, means operable by said cam in an advanced position of the engine controls to momentarily further advance said engine controls, and said means operable by said cam being ineffective to change engine controls from an initial retarded position of the engine controls.

6. An engine having a throttle, control mechanism for effecting an opening and a closing of said throttle, said throttle directly controlling the speed of the engine, a shaft rotatably driven by said engine, cam means associated with said driven shaft, means positioned intermediate said cam means, and said throttle control mechanism arranged and constructed to directly open the throttle upon actuation of said cam means.

7. An engine having a throttle, control mechanism for effecting an opening and a closing of said throttle, said throttle directly controlling the speed of the engine, a shaft rotatably driven by said engine, cam means associated with said driven shaft, means dependent on the position of the throttle control mechanism and positioned between the cam means and said throttle control mechanism operable to intermittently accelerate the engine when the engine is running under load, and said means being rendered inoperative to accelerate the engine when the engine is idling.

8. An engine producing rotation of parts, said engine having a throttle, a governor for controlling said throttle, a hand lever for changing the governor setting, and means operable upon the rotation of said parts to intermittently cause regular engine surging comprising a cam associated with said rotating parts, means directly imparting cam movement to said throttle in one position of said governor hand lever, and means associated with said governor hand lever to render said engine surging means inoperative.

9. An engine having a throttle, a governor directly controlling the position of said throttle, a shaft rotatably driven by said engine, a cam on said shaft, and linkage means interposed between the cam and said throttle whereby the throttle is controlled independently of said governor.

10. An engine having a throttle, a governor directly controlling the position of said throttle, a shaft rotatably driven by said engine, a cam on said shaft, linkage means interposed between the cam and said throttle whereby the throttle is controlled independently of said governor, manually operable lever means for changing the governor setting, and means joining said manually operable lever means and said linkage means in a manner to provide for increased engine acceleration when the governor setting is initially high and to render ineffective said linkage means to control the throttle.

11. An engine having a throttle, a governor directly controlling the position of said throttle, a shaft driven by said engine, a cam on said shaft, linkage means interposed between the cam and said throttle whereby the throttle is controlled independently of said governor, an inclined slotted bracket associated with said throttle, said linkage means having an operating rod passing through said slotted bracket and movable longitudinally by said cam, a hand lever for changing governor setting, a link joining said hand lever and said operating rod, whereby movement of said hand lever moves the operating rod in the slot of said bracket, and a lug on said operating rod larger in width than said slot, said lug adapted to engage and move said bracket when the hand lever is at an initially high governor setting and to be inactive to move said bracket because of its adjacent inclination at an initially low governor setting.

SAMUEL J. STEVENSON.
THEODORE H. KLUSMAN.
HERMAN S. FISHER.

REFERENCES CITED

The following references are of record in the file of this patent:

UNITED STATES PATENTS

| Number | Name | Date |
|---|---|---|
| 2,217,364 | Halford et al. | Oct. 8, 1940 |
| 2,260,576 | Maybach | Oct. 28, 1941 |
| 2,302,322 | Howard | Nov. 17, 1942 |